United States Patent
Chen

(10) Patent No.: US 9,387,601 B2
(45) Date of Patent: Jul. 12, 2016

(54) ADJUSTABLE WIDTH, THIN BLADE, MICRO-TRENCHING CUTTING MACHINE

(71) Applicant: Verizon Patent and Licensing Inc., Arlington, VA (US)

(72) Inventor: David Z. Chen, Richardson, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 136 days.

(21) Appl. No.: 14/218,076

(22) Filed: Mar. 18, 2014

(65) Prior Publication Data

US 2015/0266207 A1    Sep. 24, 2015

(51) Int. Cl.
  *B28D 1/04* (2006.01)
  *G02B 6/50* (2006.01)
  *B23D 45/10* (2006.01)

(52) U.S. Cl.
  CPC .............. *B28D 1/045* (2013.01); *B23D 45/10* (2013.01); *G02B 6/504* (2013.01)

(58) Field of Classification Search
  CPC ............ B28D 1/04; B28D 1/045; G02B 6/50; G02B 6/504
  USPC ......... 125/13.01, 13.03, 14, 38; 451/352, 350
  See application file for complete search history.

(56) References Cited

U.S. PATENT DOCUMENTS

| 4,542,940 A * | 9/1985 | Marten | E02F 3/188 173/8 |
| 4,662,684 A * | 5/1987 | Marten | B28D 1/045 299/1.5 |
| 8,267,744 B2 * | 9/2012 | Stratti | E21C 31/02 125/13.01 |

* cited by examiner

Primary Examiner — Robert Rose

(57) ABSTRACT

An apparatus, method, and system are disclosed for cutting materials such as concrete. The apparatus includes a mounting assembly, and a pair of blades that are mounted at an end of the mounting assembly. Various types of driving assemblies can be provided to supply the force necessary to rotate the two blades. The distance between the blades can also be varied in order to adjust the width of the cut.

20 Claims, 6 Drawing Sheets

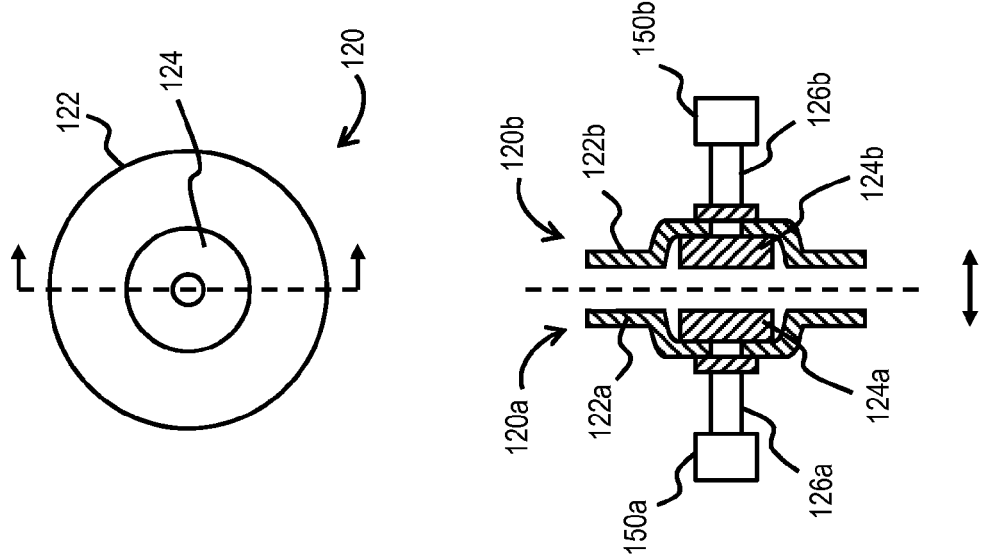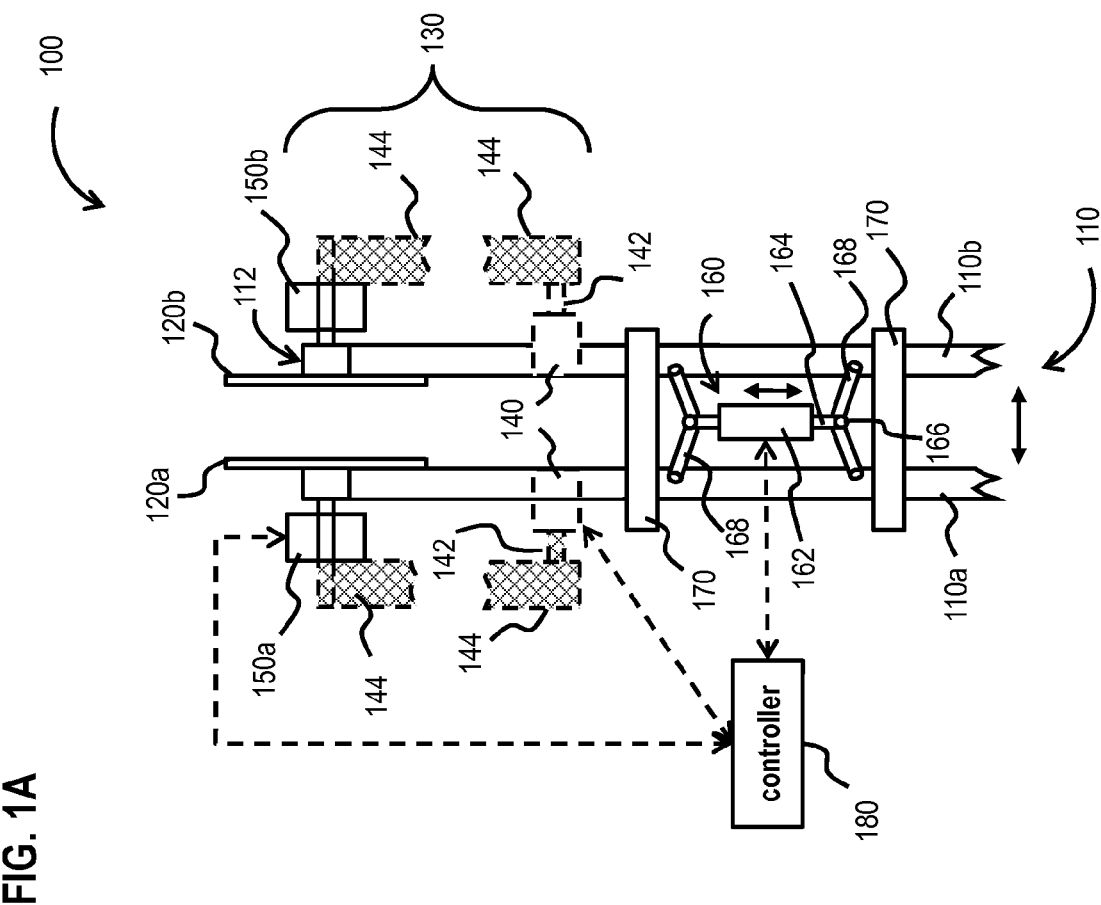

ADJUSTABLE WIDTH, THIN BLADE, MICRO-TRENCHING CUTTING MACHINE

BACKGROUND INFORMATION

Technological advancements often result in increased demands for the latest features, services, and content from consumers. This increased demand requires continuous upgrades in infrastructures in order to keep up the increased loads in, for example, data transmission. Such infrastructure upgrades often involve migration of voice and data communication services from metal (e.g., copper, aluminum, coaxial, etc.) to optical fiber (also referred to as fiber optics or simply fiber), as well as improvements in existing optical fiber lines.

Such infrastructure upgrades, however, require deployment of optical fiber lines underground and/or removal of existing legacy cables. Accordingly, roadways and walkways must be demolished in order to deploy the upgraded cables, often resulting in increased pollution and congestion. Oftentimes, the increased pollution results from the level of dust and debris created through the use machinery utilizing blades which cut the roadways and walkways in a grinding manner to create a single large cut. Many cities and localities, however, have strict restrictions on the level of demolition allowed for deployment of subterranean cables. Although such restrictions are intended to reduce the damage and pollution, they also adversely limit the process of upgrading existing infrastructures.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 1A is a diagram of a cutting device, according to one embodiment;

FIG. 1B is a diagram of the blades used in the cutting device, according to one embodiment;

DETAILED DESCRIPTION OF PREFERRED EMBODIMENTS

Figure 2:
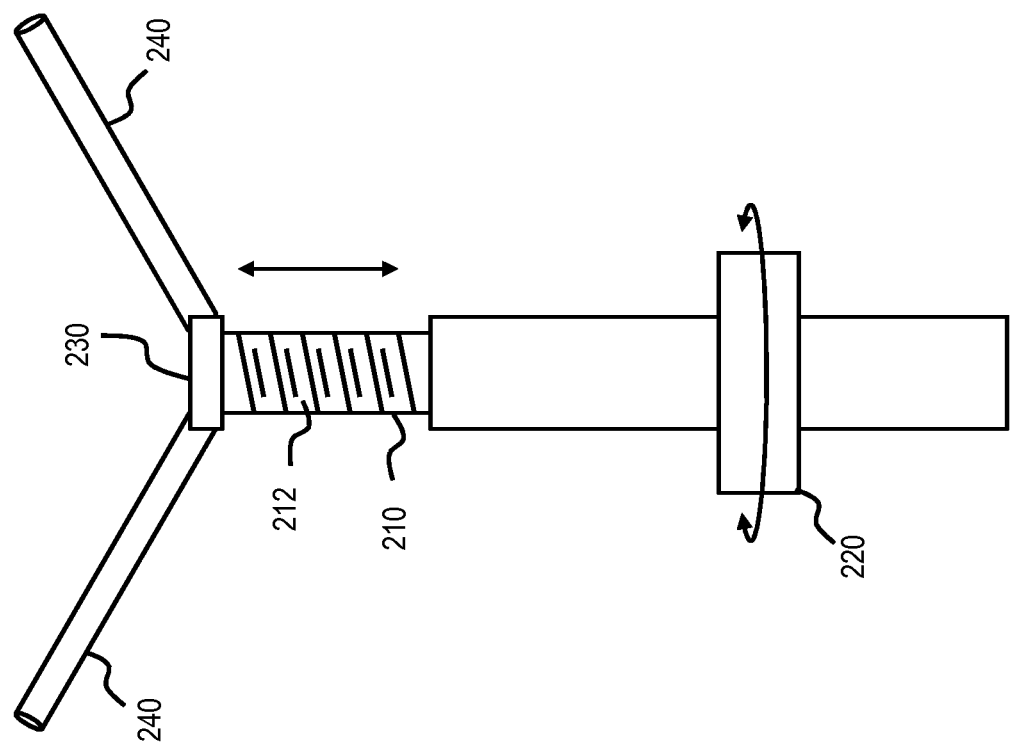
FIG. 2 is a diagram of an adjustment mechanism, according to one embodiment.

An apparatus, method, and system for cutting materials are described. In the following description, for the purposes of explanation, numerous specific details are set forth in order to provide a thorough understanding of the present invention. As is well known, the present invention may be practiced without these specific details or with an equivalent arrangement. In other instances, well-known structures and devices are shown in block diagram form in order to avoid unnecessarily obscuring the present invention.

FIG. 1 illustrates a cutting device 100 in accordance with at least one embodiment. The cutting device 100 includes a mounting assembly generally indicated by reference numeral 110. A first blade 120a and a second blade 120b are rotatably mounted at one end of the mounting assembly 110. The blades 120a, 120b are mounted in such a manner that they are capable of rotating at prescribed velocities in order to cut a selected material. The cutting device 100 also includes a driving assembly 130 and an adjustment mechanism 150.

The driving assembly 130 is configured for supplying the necessary force to rotate the first blade 120a and the second blade 120b at the desired velocities. According to at least one embodiment, the driving assembly 130 can be in the form of a motor 140 that is mounted on the mounting assembly 110. A driveshaft 142 and, for example, a belt drive mechanism 144 can be coupled to the blades 120a, 120b in order to transmit force generated by the motor 140 to the blades for cutting the material. As illustrated in FIG. 1A, a separate motor 140 and belt drive mechanism 142 are provided for driving each of the blades 120a, 120b. According to various embodiments, however, a single motor 140 can be mounted on the mounting assembly 110 with two drive shafts 142 and two belt drive mechanisms 144 for simultaneously driving both the first blade 120a and the second blade 120b. According to such an embodiment, both blades 120a, 120b are rotated at the same velocity.

According to an embodiment, the first blade 120a and the second blade 120b can be rotated at different velocities. As previously discussed, a separate motor 140 and belt drive mechanism 144 can be provided for controlling rotation of each of the blades 120a, 120b. Accordingly, the motors 140 can be driven at different speeds whereby the velocity of the blades 120a, 120b can differ from each other. Such a configuration allows the first blade 120a and the second blade 120b to cut through two different types of materials simultaneously. Accordingly, the velocity of each blade 120a, 120b can be optimized for the specific material being cut.

FIG. 1A further illustrates another embodiment for the driving assembly 130. According to such an embodiment, a first motor 150a is directly coupled to the first blade 120a, while a second motor 150b is directly coupled to the second blade 120b. Thus, the first and second motors 150a, 150b can be independently controlled to provide different rotational velocities to the blades 120a, 120b, or to rotate the first blade 120a and the second blade 120b at the same velocity. Furthermore, according to an embodiment, if the first motor 150a is inoperable, the first and second blades 120a, 120b can be adjusted to rotate as a single blade. The second motor 150b can then be used to rotate both blades.

According to at least one embodiment, a controller 180 can be provided for controlling operation of the motors (140, 150) in the driving assembly 130. For example, if the motors 150a, 150b are directly attached to the first blade 120a and the second blade 120b, the controller 180 can directly control the output of the motors 120a, 120b in order to selectively provide a desired velocity to each of the first blade 120a and the second blade 120b. Alternatively, the controller 180 can drive the motors 150a, 150b to rotate the first and second blades 120a, 120b at the same velocities. Similarly, if the driving assembly 130 includes a motor 140 and belt drive mechanism 144, the controller 180 can also be used to control operation of the motors 140 thereby controlling the resulting velocities transmitted through the belt drive mechanism 144.

According to at least one embodiment, the mounting assembly 110 can be configured as one or more rails 110a, 110b. Each rail 110a, 110b includes a distal end 112 upon which the first and second blades 120a, 120b are mounted. Thus, if two rails 110a, 110b are provided for the mounting assembly, the first blade 120a can be mounted on the first rail 110a, while the second blade 120b can be mounted on the second rail 110b. Additional rails can be provided, however, without the need to mount any blades thereon. The rails 110a, 110b can function as a secure platform upon which, for example, motors 140 for the belt drive mechanism 144 can be directly mounted. Furthermore, other components of the cutting device 100 can also be mounted on the rails 110a, 110b.

According to at least one embodiment, the cutting device 100 can include an adjustment mechanism 160 which allows the distance between the blades 120a, 120b to the selectively varied. Thus, the adjustment mechanism 160 can cause the distance between the blades 120a, 120b to increase up to a predetermined amount. According to one or more embodiments, the distance between the blades 120a, 120b can be adjusted from about 0.25 inch to over 3 feet. Furthermore, the adjustment mechanism 160 can cause the distance between the blades 120a, 120b to be reduced to a minimum desired distance. According to at least one embodiment, the adjustment mechanism 160 can adjust the blades 120a, 120b to a point where they contact each other and function as a single cutting blade.

According to an embodiment, the adjustment mechanism 160 can be in the form of a hydraulic system. The hydraulic system can include, for example, one or more hydraulic units 162 that include at least one actuator 164 disposed therein. The actuators 164 are configured such that they can be extended out of the hydraulic unit 162 and retracted into the hydraulic unit 162 based on applied hydraulic pressures. As illustrated in FIG. 1A, for example, the hydraulic unit 162 includes two actuators 164 that are disposed on opposite sides thereof. The actuators 164 include at least a portion that extends beyond the hydraulic unit 162.

A joint assembly 166, such as a universal joint, can be coupled to the external end of each actuator 164. Such a joint assembly 166 can be in the form of a universal type joint which can have various degrees of freedom to allow transfer of motion between two different components. According to the embodiment illustrated in FIG. 1A, a pair of pivot arms 168 are attached to each actuator 164 by means of the joint assembly 166. In particular, the pivot arms 168 include a proximal and, and a distal end. The proximal end of each pivot arm 168 is connected to the actuator 164 via the joint assembly 166. The distal ends of the pivot arms 168 are attached to the mounting assembly 110 at different portions thereof. For example, if the mounting assembly 110 includes two rails 110a, 110b, then the distal ends of the pivot arms 168 are respectively coupled to each rail 110a, 110b of the mounting assembly 110. According to at least one embodiment, a joint assembly can also be provided on the rails 110a, 110b, and the distal end of the pivot arms 168 can be coupled to the rail 110a, 110b by means of the joint assembly.

According to an embodiment, in order to vary the distance between the first blade 120a and the second blade 120b, hydraulic fluid can be controlled to provide sufficient pressure for extending the actuators 164 out of the hydraulic unit 162. Extension of the actuators 164 causes the angle between the pivot arms 168 to increase, thereby pushing the rails 110a, 110b away from each other. This results in a greater separation between the first blade 120a and the second blade 120b. By retracting the actuators 164 into the hydraulic unit 162, the angle between each pair of pivot arms 168 is decreased, causing the rails 110a, 110b to be pulled closer to each other. This results in a decrease in the distance between the first blade 120a and the second blade 120b. As further illustrated in FIG. 1A, one or more stabilizing units 170 can be provided on the mounting assembly 110. According to an embodiment, the stabilizing units 170 can include tracks (not shown) which allow adjustment of the rails 110a, 110b in one direction (e.g., lateral direction), while preventing the rails 110a, 110b from moving in another direction (e.g., longitudinal direction).

FIG. 1B illustrates the blades 120 (also 120a, 120b) of the cutting device 100 in accordance with at least one embodiment. Each blade 120a, 120b can include, for example, a cutting portion 122 (also 122a, 122b) that is designed to engage the material being cut. The cutting portion 122 forms a sectional part of the blade 120a, 120b which can be used to adjust the depth of the cut required. The blade 120a, 120b also includes an engaging portion 124 (also 124a, 124b) that is centrally located relative to the cutting portion 122. According to at least one embodiment, the engaging portion 124 is sized such that the motors 150a, 150b do not extend into the area defined by the cutting portion 122 in order to prevent any damage. For example, the motors 150a, 150b are shown as having a diameter that is smaller than the engaging portion 124. A driveshaft 126a, 126b extends from each motor 150a, 150b in order to directly drive the blades 120a, 120b. As previously discussed, the adjustment mechanism 160 can be controlled, for example, by the controller 180 to bring the blades 120a, 120b in contact with each other such that they operate as a single compound blade. According to at least one embodiment, the engaging portion 124a, 124b of the blades can include gear teeth or other physical features which assist in securing the first blade 120a and the second blade 120b together during operation as a single cutting blade.

According to one or more embodiments, the blades 120a, 120b can be constructed from metals such as, for example steel and steel alloys, that have been treated to improve hardness properties in order to perform the cutting functions. The blades 120a, 120b can also be constructed from various other alloys, and alloys that have been heat treated in order to improve properties such as hardness. The use of metals and metal alloys allows the blades 120a, 120b to be constructed with very thin dimensions, thereby reducing the level of dust produced when materials such as concrete are being cut. For example, each blade 120a, 120b can have a thickness that is less than 0.25 inch. Thus, even if the first and second blades 120a, 120b are adjusted to contact each other, the width of the resulting cut would be less than 0.5 inch. According to an embodiment, the diameter of each blade 120a, 120b can be less than 2 feet. However, the diameter of each can be greater than 2 feet depending on the depth required for the cut.

FIG. 2 illustrates an adjustment mechanism 200 in accordance with at least one embodiment. The adjustment mechanism 200 of FIG. 2 is configured as a mechanical system. As such, the adjustment mechanism 200 includes a linear actuator 210 and a rotational assembly 220. The linear actuator 210 includes a threaded surface 212, while the rotational assembly 220 includes an internally threaded surface (not shown). The rotational assembly 220 is disposed on at least a portion of the linear actuator 210. By turning the rotational assembly 220 clockwise or counterclockwise, the internal threads engage the threaded surface 212 of the linear actuator 210 causing the linear actuator 210 to extend or retract. A joint assembly 230 can also be provided at the external end of the linear actuator 210 in order to facilitate attachment of a pair of pivot arms 240. According to at least one embodiment, the rotational assembly 220 can be operated by means of a motor (not shown) that can be controlled by the controller (e.g., 180). Thus, the controller can also be used to adjust the distance between the first blade and the second blade by using the adjustment mechanism 200.

Figure 3:
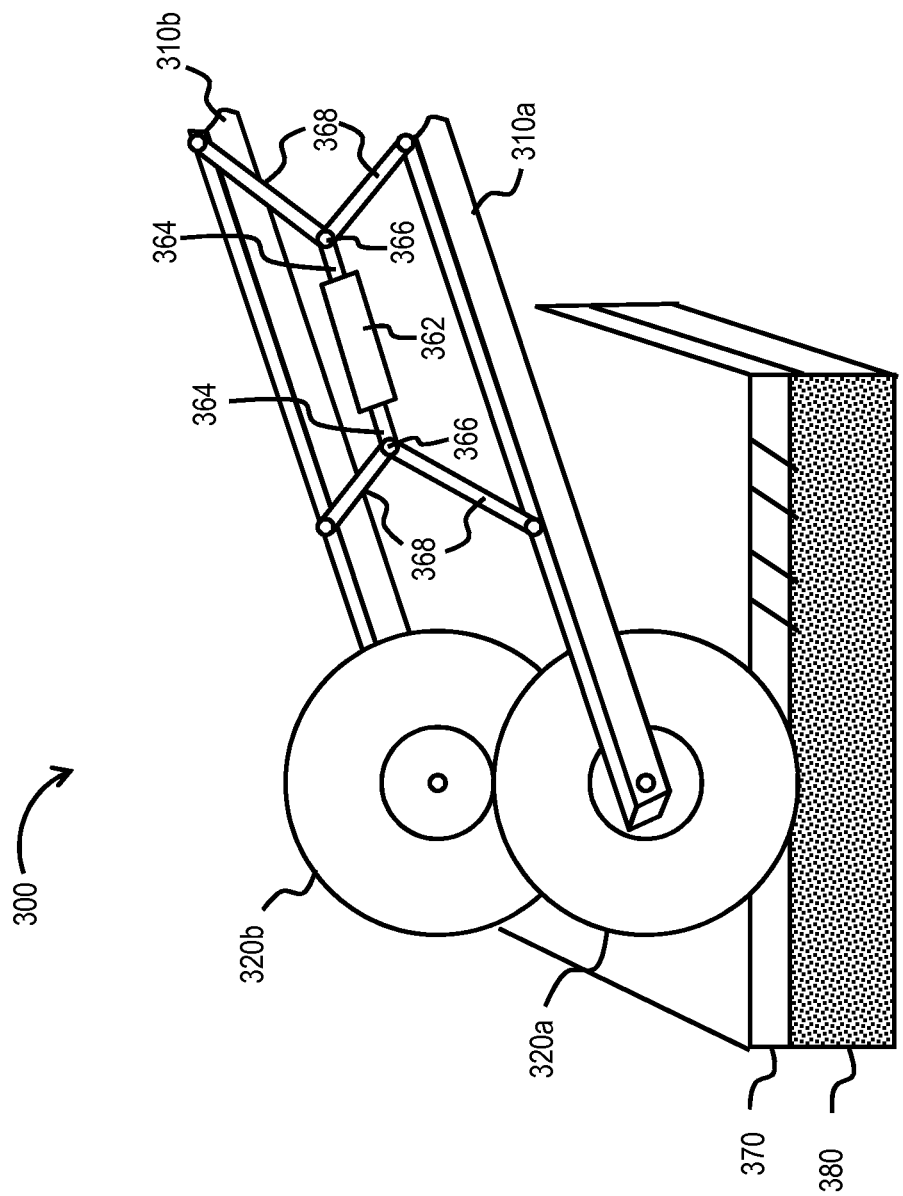
FIG. 3 is a diagram of a cutting device engaging a material, according to one embodiment.

FIG. 3 illustrates the cutting device 300 engaging a material in order to produce a cut. The cutting device can include, for example, a mounting assembly having two rails 310a, 310b. A first blade 320a and a second blade 320b are rotatably mounted at one end of each respective rail 310a, 310b. As illustrated in FIG. 3, the cutting device 300 includes an adjustment mechanism that is in the form of a hydraulic system. As previously discussed, such a system can include one or more hydraulic units 362 that include at least one actuator 364 disposed therein. A joint assembly 366 is coupled to the external end of each actuator 364, and a pair of pivot arms 368 are attached to each actuator 164 by means of the joint assembly 166. The actuators 364 can be extended out of the hydraulic unit 162 in order to increase the distance between the first blade 320a and the second blade 320b. Conversely, the actuators 364 can be retracted into the hydraulic unit 362 in order to decrease the distance between the first blade 320a, and the second blade 320b.

According to at least one embodiment, the cutting device 300 can be configured to cut materials, for example, such as concrete 370 in residential locations. In such instances, the concrete 370 is typically provided over a layer of soil 380 at a predetermined thickness. In order to cut the concrete 370, the blades 320a, 320b can be adjusted to a depth corresponding to the thickness of the concrete 370 plus a predetermined depth for deploying a cable. For example, if the concrete 370 has a thickness of 6 inches and a depth of 3 inches is required for deploying a particular cable and/or duct, then the blades would be adjusted to a depth of 9 inches. This depth corresponds to the thickness of the concrete 370 plus the depth required to deploy the cable and/or duct in the soil 380. Once the blades 320a, 320b cut through the concrete 370, the concrete 370 can be freely separated from the layer of soil 380 beneath it. This can allow, for example, safe and quick infrastructure upgrades such deployment of optical fiber cables.

Figure 4:
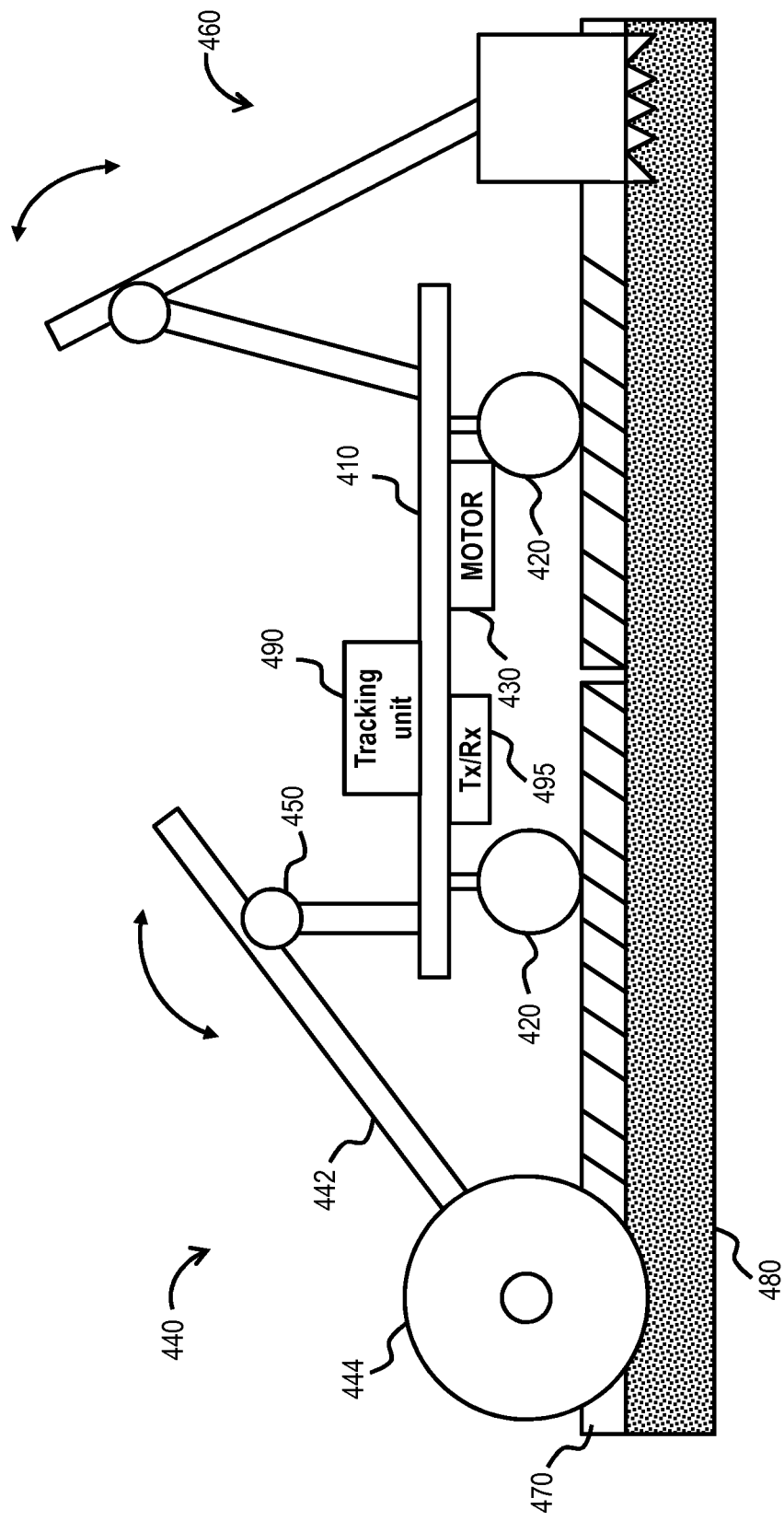
FIG. 4 is a diagram of a system for cutting materials, according to one embodiment.

FIG. 4 illustrates a system 400 for cutting materials in accordance with at least one embodiment. The system 400 includes a frame assembly 410 that includes a plurality of wheels 420 for providing motion. At least one motor 430 can be provided for driving the wheels 420, thereby causing the frame assembly 410 to move in a desired direction. A cutting device 440 is mounted on the frame assembly 410. As illustrated in FIG. 4, the cutting device 440 includes a mounting assembly 442 which has the first and second blades 444 (only one shown) mounted at an and thereof. A blade height adjuster 450 is also provided for controlling the height of the blade 444 in order to produce a cut having a desired depth. According to at least one embodiment, the blade height adjuster 450 can be controlled by the controller (e.g., 180).

The cutting system 400 also includes an excavation unit 460 that is mounted on an opposite and of the frame assembly 410. The excavation unit 460 is capable of engaging portions of material that have been cut by the cutting device 440. According to at least one embodiment, the excavation unit 460 is configured such that it is capable of grasping a section of material having a width corresponding to the largest distance achievable between the first and second blades 444. Thus, according to at least one embodiment, the height of the blades 444 can be adjusted by the blade height adjuster 450 in order to achieve a depth that will separate material, such as concrete 470 from soil 480. The depth can further be adjusted to incorporate space for deploying one or more cables in the soil 480. The controller can control the frame assembly motor 430 to move the frame assembly 410 along the cutting direction, thereby producing a continuous cut of concrete 470 material.

According to at least one embodiment, the concrete 470 being cut can be separated into multiple sections while moving along the cutting direction. Once the frame assembly 410 passes a predetermined cut section of concrete 470, the excavation unit 460 can engage the section of cut concrete 470 in order to remove it. The section of cut concrete 470 can then be placed into a transportation or utility vehicle such as, for example, a dump truck for disposal. According to other embodiments, the concrete 470 can also be recycled and/or reused. For example, at least one operation of the system 400 is to utilize the cutting device 440 to remove a concrete layer for deployment of various transmission and communication cables. Thus, upon removing a section of concrete 470, the cables can be deployed, and the cut section of concrete can be replaced over the cables.

According to an embodiment, various components can be provided to assist with control and positioning of the cutting system 400. For example, a tracking unit 490 can be mounted on the frame assembly 410. The tracking unit 490 can be configured, for example, as a global positioning system (GPS) unit, or an appropriate device equipped with a GPS receiver, hardware, and/or software. For example, tracking unit 490 can be used to accurately detect the position and displacement of the cutting system 400. Information regarding position and displacement can be provided to an operator in order to control and/or monitor the process.

A communication unit 495 can further be mounted on the frame assembly 410 in order to transmit and receive information to/from an operator. The communication unit 495 can be configured to utilize various transmission protocols, including wired/wireless networking, mobile, satellite, or a combination thereof. For example, wired and wireless networking protocols can operate on a variety of IEEE 802 standards. Mobile protocols can include, for example, Enhanced Voice-Data Optimized (EVDO), Universal Mobile Telecommunications System (UMTS), High Speed Packet Access (HSPA), General Packet Radio Service (GPRS), Worldwide Interoperability for Microwave Access (WiMAX), Long Term Evolution (LTE), etc. It should be noted that the foregoing list is only intended to be exemplary, and is not intended to limit the manner in which the communication unit 495 is capable of operating. Rather, various other existing and developing protocols can be used to achieve the same transmission and reception functions. Furthermore various standards (i.e., wireless, mobile, satellite, etc.) may be combined in order to achieve the desired communication goals.

The tracking unit 490 can be used alone or in combination with the communication unit 495 in order to assist in controlling operation of the cutting system 400. For example, the displacement of the frame assembly 410 can be tracked using both the controller and tracking unit 490 in order to improve accuracy. The tracking unit 490 can also supply information directly to the communication unit 495 for transmission to an operator. Thus, the operator can have real-time information regarding movement of the cutting system.

Figure 5:
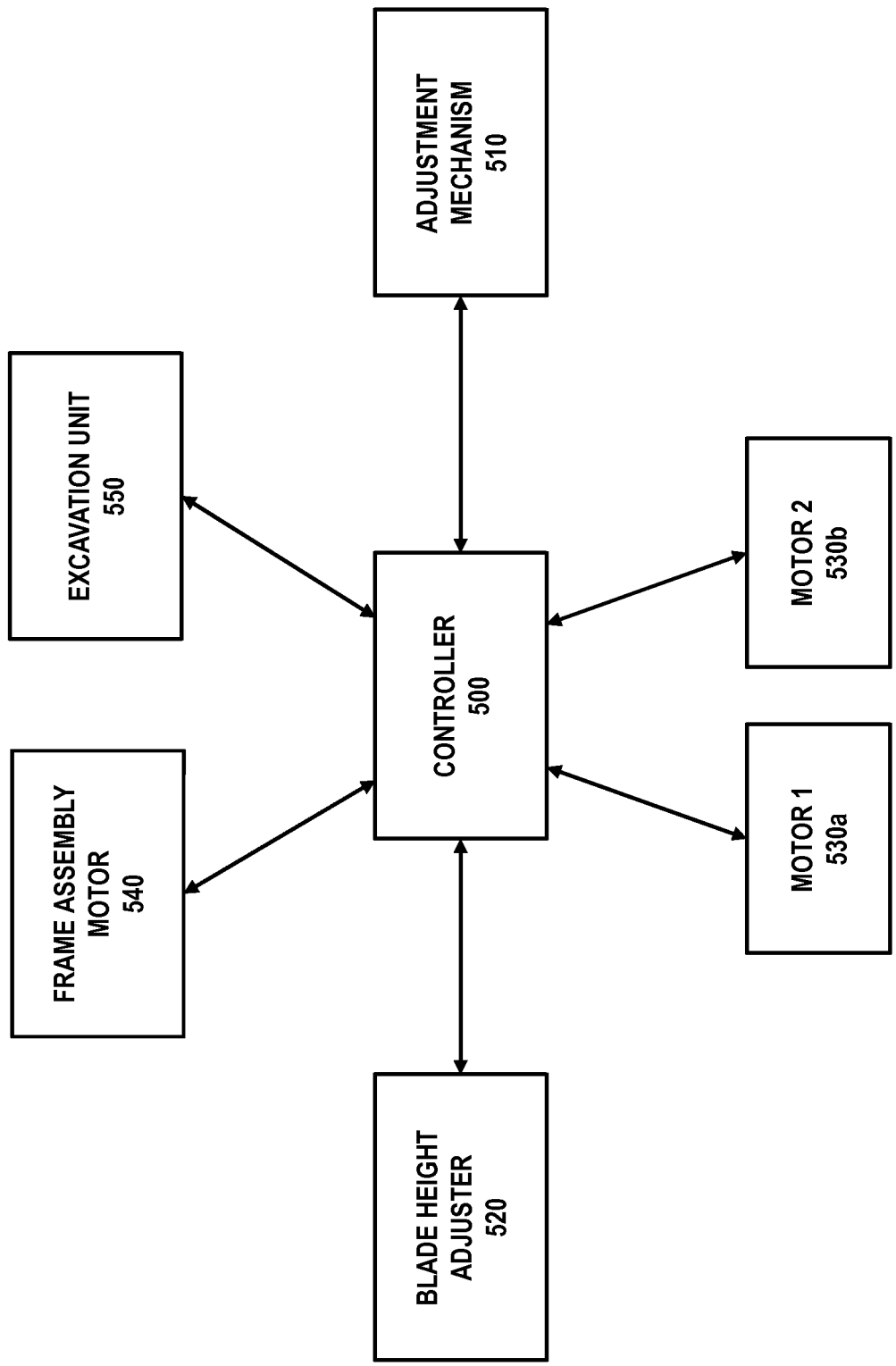
FIG. 5 is a block diagram of control components useable in a system for cutting materials, according to one embodiment.

FIG. 5 is a block diagram illustrating an arrangement for controlling various components of a system incorporating a cutting device in accordance with at least one embodiment. A controller 500 is provided for monitoring, adjusting, and controlling operations of various components. Although FIG. 5 illustrates a controller 500, it should be noted that various computing devices such as, for example, a personal computer, laptop, etc. can be configured to interface with the various components and perform the same operations as the controller. Accordingly, the use of a controller should not be construed as limiting. Rather various other devices can also be configured and/or programmed to perform similar operations.

As previously discussed, the controller 500 can be configured to receive input from the adjustment mechanism 510 and provide control signals for controlling operation of the adjustment mechanism 510 in order to vary the distance between the first blade and the second blade. The controller 500, therefore, is capable of operating different configurations of the adjustment mechanism 510, such as the hydraulic mechanism and mechanical mechanism. The controller 500 is also capable of controlling operations of the blade height adjuster 520. Accordingly, once the controller 500 has controlled the adjustment mechanism 510 to achieve the desired distance between the first and second blades, the blade height adjuster 520 is controlled to vary the height of the first and second blades so that the material can be cut up to a desired depth. For example, if the material being cut is in the form of a concrete slab having a thickness of 6 inches, the controller 500 would control operation of the blade height adjuster 520 such that the first and second blades are driven to a depth of approximately 6 inches from the surface of the concrete. According to one or more embodiments, the controller 500 may further control the blade height adjuster 520 to increase the depth of the first and second blades by a predetermined tolerance level in order to ensure that the concrete has been completely separated from the soil.

According to at least one embodiment, the controller 500 controls operation of the motors 530a, 530b in order to achieve a desired rotational velocity for the first and second blades. The rotational velocity can be selected based on various factors. For example, if both blades will be cutting an identical material, then the controller 500 can operate the motors 530a, 530b to provide the same rotational velocity to each of the blades. Various embodiments, however, provide for cutting of two different surfaces that may be adjacent to each other. The two surfaces can correspond to different materials having different densities, compositions, etc. In such embodiments, the controller 500 can control the first motor 530a and the second motor 530b at different speeds. This causes the first and second blades to be respectively driven at different rotational velocities. The specific rotational velocity applied to each blade can depend on the specific material being cut. Therefore, the amount of variation between the two rotational velocities is only limited to mechanical limits of the motor. More particularly, a nearly infinite number of variations can be produced with respect to the differences in rotational velocities of the first blade and the second blade.

The controller 500 can also be configured to control operation of the frame assembly motor 540. Accordingly, the controller 500 can select the speed at which the frame assembly travels, thereby directly affecting the rate at which the material is cut. Furthermore, according to various embodiments, the controller 500 can adjust the rotational velocity of the first blade and the second blade based on the speed at which the material is being cut. For example, if the material being cut has a great density and resistance to cutting, the frame assembly motor 540 can be driven at a slower speed in order to allow the blades to properly cut the material. Furthermore, the first and second motors 530a, 530b can be driven at higher velocities to improve the rate at which the first and second blades actually contact the material being cut.

As further illustrated in FIG. 5, the controller 500 can also control operation of the excavation unit 550 to remove sections of material that have been cut. According to at least one embodiment, this process can be performed based, at least in part, on additional information available to the controller 500, as well as operations that are directly under control of the controller 500. For example, the controller 500 is capable of controlling the frame assembly motor 540, thereby defining the rate at which the frame assembly travels. Accordingly, the controller 500 can be configured to perform various calculations that determine the distance traveled by the frame assembly as well as the point in time at which the frame assembly moves past a section of cut material. At this point, the excavation unit 550 can be controlled to retrieve the material without causing damage to the frame assembly.

Figure 6:
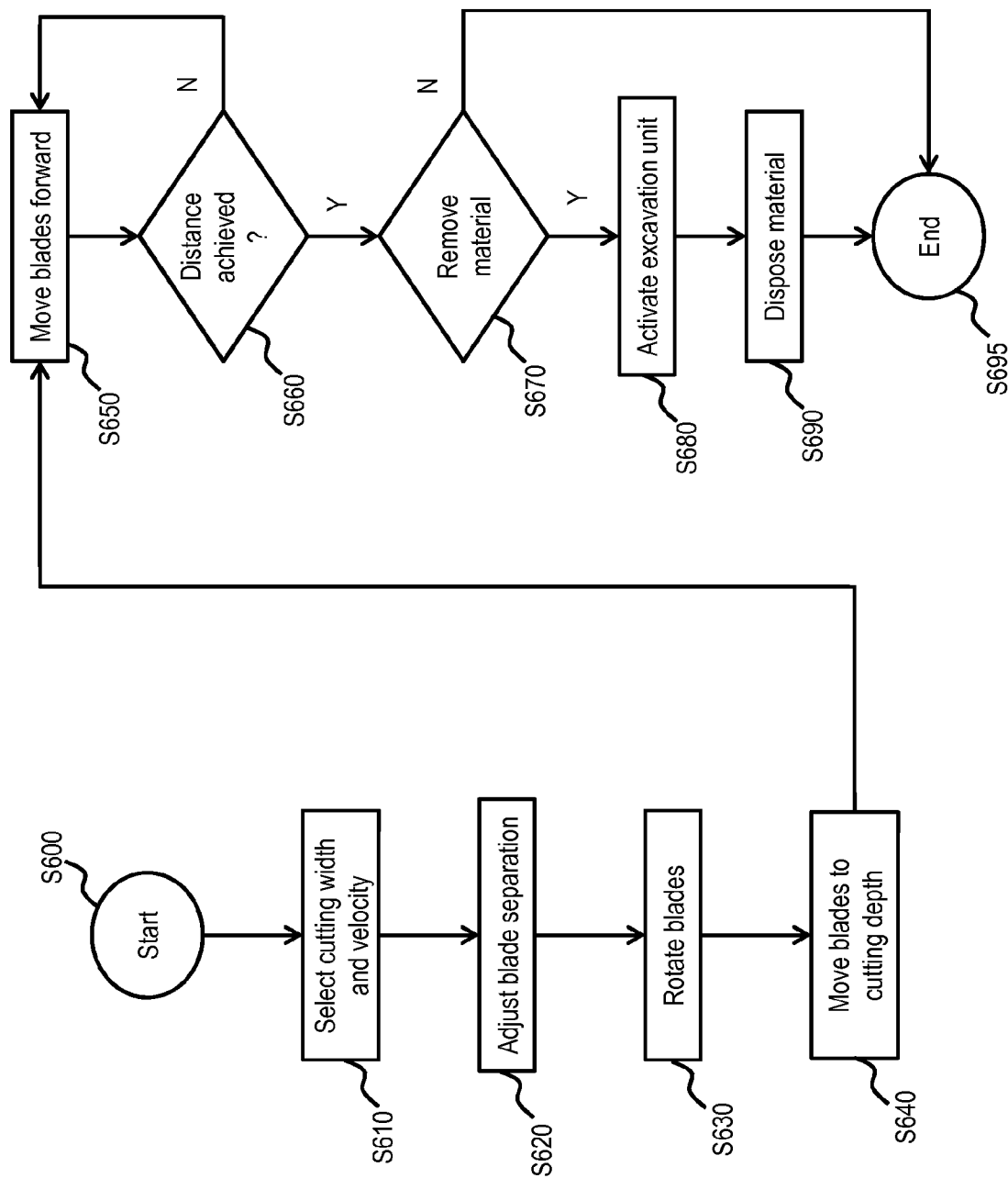
FIG. 6 is a flowchart illustrating a process for cutting materials, according to one embodiment.

FIG. 6 is a flowchart illustrating a process for cutting a material in accordance with at least one embodiment. The process begins at S600 where the system can be initialized. At S610, a cutting width and velocity are selected for cutting the material. The selected cutting with can be based, for example, on the desired purpose for cutting the material. For example, if a small cable duct will be deployed, then a cutting with of 8 inches may be appropriate. Accordingly, the cutting with can be selected based on the specific operation being performed, including the thickness of the concrete and the depth required to deploy the cable in the soil beneath the concrete. The velocity of blades can also be selected based on the material to be cut. For example if both blades with cut the same material, then the same velocity can be selected for both blades. This velocity can be, for example, higher for harder materials such as concrete and lower for softer materials. Furthermore, if two different types of materials (e.g., one hard and one soft) will be cut, then the velocity of the first blade can be selected higher in order to cut the hard material and the velocity of the second blade can be selected lower than that of the first blade in order to cut the soft material. Accordingly, the specific velocity for rotating the blades is selected based on the material being cut and standard guidelines for setting the proper blade velocity, as well as the material from which the blade is constructed.

At S620, the separation between the first blade and the second blade is adjusted to correspond with the selected cutting width. As previously discussed, the distance between the first and second blades can be changed in various ways using an adjustment mechanism. According to at least one embodiment, the adjustment mechanism can be in the form of a hydraulic system that includes one or more hydraulic units, wherein each of the hydraulic units includes one or more actuators. The actuators can be extended or retracted into the hydraulic unit, and are connected to pivot arms coupled to the mounting assembly. Accordingly, by extending and retracting the actuator, the pivot arms cause the mounting assembly to vary the distance between the first blade and the second blade. According to other embodiments, the adjustment mechanism can be in the form of a mechanical system that utilizes a linear actuator and a rotational assembly.

At S630, the blades are rotated at a predetermined velocity. The rotational velocity of the first and second blades can be selected based on various factors including, but not limited to, the type of material being cut, the rate at which the cutting operation proceeds, etc. Furthermore, the rotational velocity can be controlled such that the first blade and the second blade rotate at different velocities. According to other embodiments, the separation between the first and second blades can be reduced until it is substantially eliminated, thereby resulting in a single cutting blade. In such conditions, both blades are rotated at the identical velocity.

At S640, the first and second blades are move so that they achieve the desired depth for cutting the material. As previously discussed, the blade height adjuster can be controlled to provide the precise amount of travel required to move the blades to the desired cutting debt. At S640, the blades are moved, for example, forward along cutting direction. This can be done, for example, by controlling the motor of the frame assembly to move the frame assembly and cutting device in the cutting direction. Additionally, movement of the frame assembly can be controlled to achieve a velocity which facilitates proper cutting of the material.

At S660, it is determined whether the desired cutting distance has been achieved. As previously discussed, the controller can control operation of the frame assembly motor and perform various calculations to determine displacement of the system. Accordingly, the controller can monitor the distance traveled in order to determine when the required distance has been achieved. If the required distance has not been achieved, control returns to S650 where the blades continue to be moved forward along the cutting direction.

If the desired distance has been achieved, then control passes to S670. At S670 it is determined whether the material being cut should be removed. If it is not necessary to remove the material, then the process ends. However, if the material must be removed, then control passes to S680. At this point, the excavation unit is controlled to remove the portion of material which has been cut. The excavation unit can also be controlled by the controller such that it removes the cut material after the frame assembly has moved to a point at which it clears the cut material. According to at least one embodiment, the excavation unit can be further controlled to dispose of the cut material by lifting it and placing in, for example, a storage unit or material transportation vehicle such as a dump truck. This is indicated at S690. Once the material has been disposed, the process ends at S695.

According to one or more embodiments, the results of the cutting process can be analyzed to determine whether it is sufficient for the required operation. For example, if the concrete has uneven thickness, then certain portions of the cutting area will lack sufficient depth for deploying the cable or duct. The depth of the cut may also be insufficient for separating the concrete, or the length of the cut may be determined to be insufficient. Thus, the process could optionally return to either S640 or S650. Alternatively, the process can be repeated from the starting point (i.e., S610)

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus comprising:
   a mounting assembly;
   a first blade and a second blade, each rotatably mounted at an end of the mounting assembly;
   a driving assembly, comprising a first motor coupled to the first blade and a second motor coupled to the second blade, for supplying a force to rotate the first blade and the second blade; and
   an adjustment mechanism for varying a distance between the first blade and the second blade.

2. An apparatus of claim 1, further comprising a controller for controlling, at least in part, operation of the driving assembly and the adjustment mechanism.

3. An apparatus of claim 1, wherein the mounting assembly comprises:
   at least two rails, each rail including a distal end, and
   wherein the first blade and the second blade are each respectively mounted at the distal end of one of the at least two rails.

4. An apparatus of claim 3, further comprising at least one stabilizing unit for maintaining an equal relative forward position for the first blade and the second blade.

5. An apparatus of claim 1, wherein the driving assembly further comprises:
   a first belt drive mechanism coupled to the first motor for rotating the first blade; and
   a second belt drive mechanism coupled to the second motor for rotating the second blade.

6. An apparatus of claim 1, wherein the first motor rotates the first blade at a first velocity; and the second motor rotates the second blade at a second velocity, wherein the second velocity differs from the first velocity.

7. An apparatus of claim 6, further comprising:
   a controller for controlling operation of the first motor and the second motor,
   wherein the first blade and the second blade are constructed from different materials, and
   wherein the controller controls the first motor and the second motor to respectively operate the first blade at the first velocity and operate the second blade at the second velocity.

8. An apparatus of claim 1, wherein the adjustment mechanism comprises a hydraulic system.

9. An apparatus of claim 8, wherein the hydraulic system comprises:
   a hydraulic unit;
   at least one actuator disposed within the hydraulic unit and configured for extension out of the hydraulic unit and retraction into the hydraulic unit;
   a joint assembly coupled to an external end of the at least one actuator; and
   a pair of pivot arms, each having a proximal end coupled to the joint assembly and a distal end coupled to the mounting assembly,
   wherein extension and retraction of the at least one actuator causes an increase and decrease, respectively, in the distance between the first blade and the second blade.

10. An apparatus of claim 1, wherein the adjustment mechanism comprises a mechanical system.

11. An apparatus of claim 10, wherein the mechanical system comprises:
    at least one linear actuator; and
    at least one rotational assembly disposed over at least a portion of a corresponding one of the at least one linear actuator for extending or retracting the at least one linear actuator,
    wherein extension and retraction of the at least one linear actuator causes an increase and decrease, respectively, in the distance between the first blade and the second blade.

12. An apparatus of claim 1, wherein:
    the first blade and the second blade are symmetrical,
    the first blade and the second blade are configured for engagement with each other and for rotating as a single compound blade.

13. A method comprising:
    determining a cutting width of a material to be cut;
    adjusting a distance between a first blade and a second blade of a cutting apparatus;
    rotating the first blade, using a first motor, and the second blade, using a second motor, at a predetermined velocity; and
    contacting the first blade and the second blade with the material to produce the cut.

14. A method of claim 13, wherein the adjusting comprises:
    applying a fluidic pressure to cause at least one of extension or retraction of at least one actuator; and
    causing the distance between the first blade and the second blade to increase or decrease in response to movement of a pair of pivot arms having a proximal end coupled to the at least one actuator and a distal end coupled to a mounting assembly on which the first blade and the second blade are mounted.

15. A method of claim 13, wherein the adjusting comprises:
   turning at least one rotational assembly disposed over at least a portion of at least one linear actuator; and
   extending or retracting the at least one linear actuator based on a direction of the turning, causing the distance between the first blade and the second blade to increase or decrease in response to movement of a pair of pivot arms having a proximal end coupled to the at least one linear actuator and a distal end coupled to a mounting assembly on which the first blade and the second blade are mounted.

16. A method of claim 13, wherein the rotating comprises:
   controlling operation of the first motor and the second motor to achieve the predetermined velocity.

17. A method of claim 16, wherein:
   the predetermined velocity includes a first velocity for the first blade and a second velocity for the second blade, and
   the first velocity is different from the second velocity.

18. A system comprising:
   a frame assembly including at least one motor for imparting motion in at least one direction;
   a cutting unit attached to the frame assembly, the cutting unit including:
      a mounting assembly,
      a first blade and a second blade, each rotatably mounted at an end of the mounting assembly,
      a driving assembly, comprising a first motor coupled to the first blade and a second motor coupled to the second blade, for supplying a force to rotate the first blade and the second blade, and
      an adjustment mechanism for varying a distance between the first blade and the second blade;
   an excavation unit mounted on the frame assembly for removing materials cut by the cutting unit; and
   a controller for controlling at least some operations of the cutting unit and the excavation unit.

19. A system of claim 18, wherein:
   the mounting assembly comprises at least two rails, each rail including a distal end;
   the first blade and the second blade are each respectively mounted at the distal end of one of the at least two rails; and
   at least one stabilizing unit is disposed between the at least two rails for maintaining an equal relative forward position for the first blade and the second blade.

20. A system of claim 18,
   wherein the controller operates the first motor and the second motor to respectively rotate the first blade and the second blade at different velocities.

* * * * *